United States Patent Office 2,765,071
Patented Oct. 2, 1956

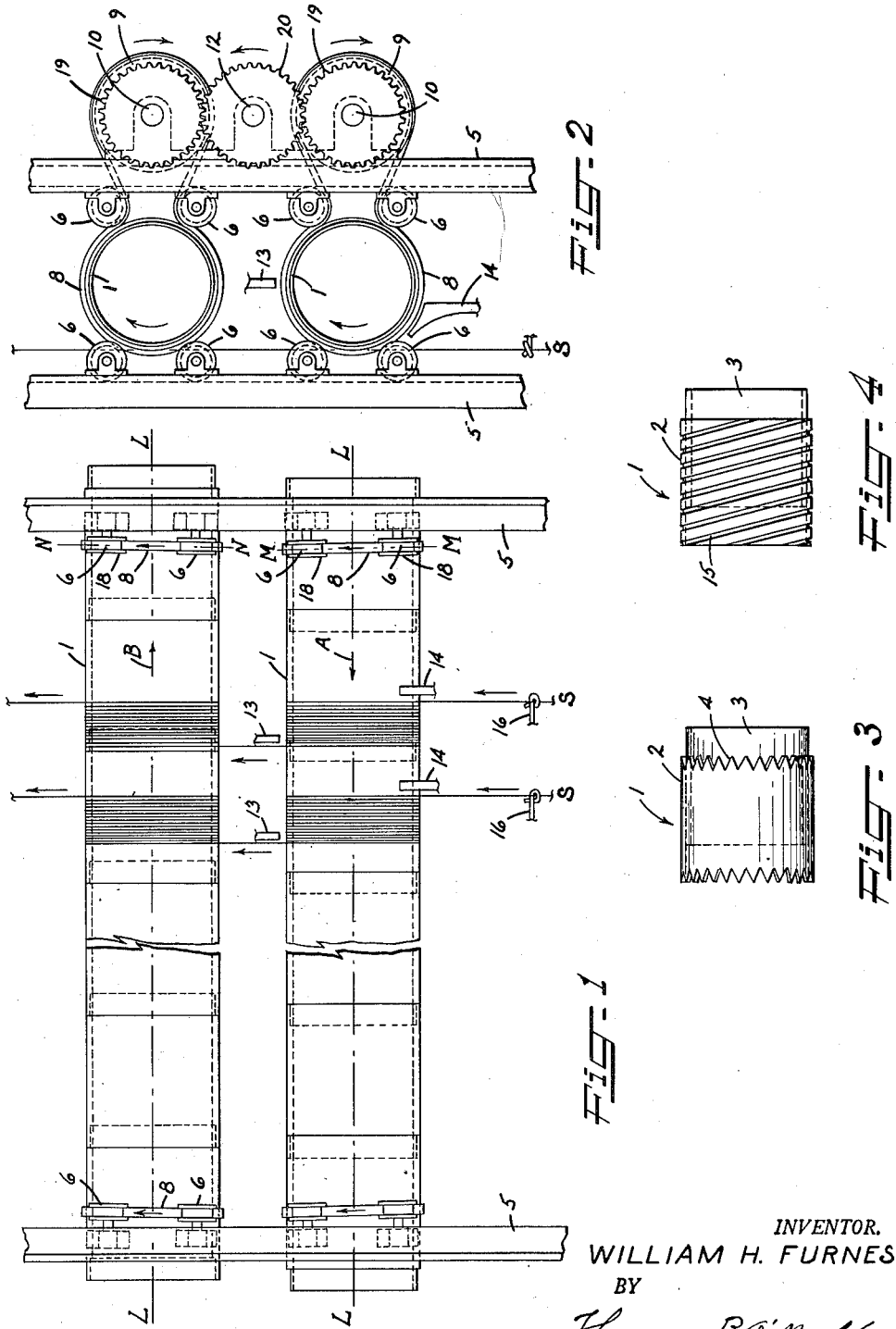

2,765,071

APPARATUS FOR HANDLING STRAND MATERIAL

William H. Furness, Haddonfield, N. J., assignor to American Viscose Corporation, Philadelphia, Pa., a corporation of Delaware Application July 27, 1951, Serial No. 238,851

4 Claims. (Cl. 203—327)

This invention relates to apparatus for forming a plurality of helical turns of traveling strand material and for advancing helical turns in an axial direction. The apparatus of the present invention may be used for the purpose of only storing strand material, or the strand material may also be subjected to fluid treatment and dried during the practice of the invention.

In methods and apparatus of the prior art for forming helical turns of traveling strand material and advancing the turns in an axial direction, the apparatus usually comprised at least two members on which the strand material was supported. The strand material was transferred alternately from one member to the other during the operation. With this procedure, the turns were often moved relative to one another so that it was difficult to keep the turns uniformly spaced apart. Also, as a portion of the strand material was not supported between the members, it was difficult to uniformly treat the strands with liquid.

This invention has for its principal object to provide apparatus for forming helical turns of strand material and for advancing the turns in an axial direction which overcome disadvantages and objections found in the methods and apparatus of the prior art.

Another object of the present invention is to provide apparatus for forming helical turns of strand material and for advancing the turns in an axial direction in which the turns may be closely spaced together and maintained in this relation during the practice of the invention.

Another object of the invention is to provide apparatus for forming helical turns of strand material and for advancing the turns in an axial direction while the strand material is uniformly supported throughout its length.

A further object of the invention is to provide apparatus for forming helical turns of strand material and for advancing the turns in an axial direction during which it may be uniformly treated with liquids and also uniformly dried thereon.

These and other objects and advantages of the invention will be apparent from the following description and accompanying drawings.

In the drawings,

Figure 1 is an elevational view of a form of apparatus embodying the invention,

Fig. 2 is an end view of the form of apparatus shown in Figure 1,

Figure 3 is a side view of one form of strand supporting element, and

Figure 4 is a side view of a modified form of strand supporting element.

This invention may be used for handling yarn, filaments, tow, bands, ribbons, and the like, and the term "strand" or "strand material" as used above and hereinafter, is intended to be inclusive.

In accordance with the present invention, the strand material is supported throughout its length, and portions of the strand are not moved relative to other portions so that helical turns of the strand may be formed closely spaced together and maintained in this relation while being advanced in an axial direction.

The apparatus embodying the invention in general comprises a plurality of cylindrical tube-like strand supporting members having interconnecting means formed thereon whereby the members may be fitted together in axial alignment and maintained in this relationship. Means are provided for rotating the tubular members about their axes and also for moving the cylindrical members together in an axial direction. Strand material is directed to the rotating tubular member from a guide means as the rotating tubular member is moved axially relative to the guide means. The strand material is wound on the tubular member in uniformly spaced helical turns which are supported throughout their length on the tubular member. Treating liquids may be applied to the strand material while on a tubular member, also the strand material may be dried thereon. As the turns of strand material are supported throughout their length on the tubular member, a minimum amount of treating liquid is required to uniformly treat the strand material throughout its length. A single set of connected strand supporting members may be used or a plurality of such sets positioned in substantially parallel relation may be employed. When a plurality of sets of the connected strand supporting members are employed, the sets may be arranged in side by side relation or one above the other. The strand supporting members of adjacent sets are moved in opposite directions.

In the embodiments of the invention shown in the drawing, reference character 1 indicates generally a strand supporting member which comprises a tubular cylindrical strand supporting portion having a cylindrical strand supporting surface 2 and a tubular cylindrical connecting portion 3. The outer diameter of the tubular connecting portion is slightly less than the inner diameter of the strand supporting portion so that adjacent strand supporting members may be connected or coupled together by telescoping the connecting portion into the strand supporting portion. The telescoping portions of adjacent strand supporting members fit sufficiently close that one member will rotate the other member at the same speed yet the members may be readily separated at the end of the machine by moving one in an axial direction relative to the other.

To insure a more positive driving connection where desired the ends of the strand supporting portions may be provided with serrated or indented portions 4 as shown in Figure 3 which interlock with the corresponding portions of adjacent thread supporting members when the members are connected together. A plurality of the strand supporting members as shown in Figure 2 connected together in axial alignment are supported by the belt members 8 in the double flanged roller members 6 mounted in the vertically extending frame members 5 positioned at each end of the plurality of interlocking strand supporting members. The connected axially aligned strand supporting members are rotated together as a unit by the belt members 8 each of which pass around a strand supporting member and around a drive pulley member 9 that is mounted on shaft 10. The belt member tightly engages the strand supporting member and is positioned thereon by the roller members 6 which engage the belt between the flanges 18 thereof which are spaced a slight distance from the periphery of the strand engaging member. The axes of the roller members 6 are canted with respect to the axis of the strand supporting member, which is indicated by broken line LL, so that the belt member passes around a strand supporting member in a plane that is inclined to the axis of the strand supporting member. The belt member rotates the strand supporting members and has a component of motion extending in an axial direction so that the strand supporting members are moved in an axial direction as they are rotated. The amount that the strand supporting members are moved in an axial direction for each revolution depends upon the angle at which the belt engaging rollers are canted. The direction the strand supporting members are moved depends on the direction in which the roller members are canted. As shown in Figure 2 of the drawing where a plurality of sets of connected strand supporting members are shown, one set positioned above the other, a plurality of strands S are directed by the guide means 16 to the lower set of strand supporting members 1 which are rotated by the belt member 8. The roller members 6 associated with the lower set of strand supporting members are canted in such direction that a belt member 8 moves in a plane indicated by the broken line M—M to move the rotating strand supporting members axially in the direction shown by the arrow indicated by reference character A which is toward the left as shown in Figure 1. Helical turns of the strand material are formed on the members as the members move in the axial direction. After a plurality of turns of strand material are formed, the strand material is then directed upwardly to the upper set of interlocking strand supporting members. The roller members 6 associated with the upper set of strand supporting members are canted in a direction opposite to the rollers of the lower set so that the belt 8 moves in a plane extending at an angle to the axis of the strand supporting member, which plane is shown by the broken line indicated by the reference character N—N. The rotating strand supporting members of the upper set are moved in an axial direction shown by the arrow indicated by reference character B toward the right as shown which is in a direction opposite to that in which the lower set of strand supporting members are moved in an axial direction. The helical turns of strand material are spaced apart a distance equal to the amount the strand supporting member is moved axially for each rotation.

Instead of using belt members, the canted rollers 6 may be formed with a cylindrical surface and positioned directly in engagement with the cylindrical strand supporting members. The canted rollers are then rotated by belt means or by gearing and in turn rotate the strand supporting members.

While two sets of strand supporting members are shown in the drawing, it is to be understood that more sets may be used arranged in the same manner, or only a single set may be used, if desired. Instead of directing a plurality of strands to the connected strand supporting members, a single strand may be directed and helical turns formed thereof which are advanced the entire length of the set of connected strand supporting members. Each set of strand supporting members may be rotated by the shaft 10 which may be driven by means that are not shown, or a drive shaft 12 may be provided which rotates the shafts 10 through the gears 19 and 20.

The helical turns of strand material may be subjected to liquid treatment while being advanced in an axial direction on the strand supporting members, such as by applying the liquid supplied by the pipe 13. The liquid that has been applied to the strand material may be removed, such as by a suction device or by means for supplying a blast of air indicated generally by reference character 14.

In order to cause the liquid applied to the strand supporting members to move in a direction countercurrent to the direction in which the strand supporting members are being advanced, the strand supporting members, as shown in Figure 4, may be provided with helical grooves 15. The pitch of the helical grooves is greater than the pitch of the turns of the strand material wound thereon so that the strands do not enter down into the grooves. The helical grooves are so inclined that they direct the liquid along the strand supporting members as they rotate in a direction counter to the direction in which the strands advance. Where it is desired, the strand material may be dried on the members by directing heated air thereto, or the members may be made of heat conducting material with heat supplied to the interior of the members.

A strand supporting member after advancing to the end of the machine adjacent a support 5 is removed and is connected to the other end of the plurality of interconnected strand supporting members or is placed at the end of the set of strand supporting members that are positioned adjacent thereto. Where two sets of strand supporting members are used, as shown in the drawing, the lower set, as shown in Figure 1, continually moves to the left while the upper set moves toward the right. The strand supporting members of the lower set, as they are moved axially to the left and pass beyond the supporting means at the left are removed and are then elevated and connected to the upper set to move therewith toward the right. Similarly the strand supporting members of the upper set as they are moved axially to the right and pass beyond the supporting means at the right are removed and are then lowered and connected to the lower set to move with the lower set toward the left.

While preferred embodiments of this invention have been shown, it is to be understood that changes and variations may be made without departing from the spirit and scope of the invention as defined in the appended claims.

I claim:

1. In apparatus for handling and treating yarn, the improvement which comprises a segmental drum on which turns of yarn are wound, each segment of said drum comprised of drivingly interlocked telescopic sections whereby the drum is self-supporting from end to end, a driving belt partially surrounding one end of the drum and in which the drum is journaled, means for driving said belt, and means for guiding the belt while in contact with the periphery of the drum in a helical path whereby the drum segments as a unit are moved axially in the belt.

2. Apparatus as defined in claim 1 in which the belt guiding means comprises a plurality of flanged rollers.

3. Apparatus as defined in claim 1 in which the drum is supported by a driving belt at each end.

4. Apparatus as defined in claim 1 in which the guiding means comprises a plurality of rollers, each having its axis canted with respect to the axis of said segmental drum.

References Cited in the file of this patent

UNITED STATES PATENTS

| 1,568,958 | Carter | Jan. 12, 1926 |
| 1,682,453 | Willheim | Aug. 28, 1928 |
| 1,887,434 | Sammis | Nov. 8, 1932 |
| 2,166,608 | Postlewaite | July 18, 1939 |
| 2,166,609 | Putnam | July 18, 1939 |
| 2,416,533 | Naumann | Feb. 25, 1947 |
| 2,453,366 | Furness | Nov. 9, 1948 |
| 2,578,330 | Kohorn | Dec. 11, 1951 |
| 2,606,358 | Furness | Aug. 12, 1952 |
| 2,677,167 | Ewing | May 4, 1954 |
| 2,692,565 | Cummings | Oct. 26, 1954 |

FOREIGN PATENTS

| 876,579 | France | Nov. 10, 1942 |